US005618494A

United States Patent [19]

Bunce et al.

[11] Patent Number: 5,618,494

[45] Date of Patent: Apr. 8, 1997

[54] CAPILLARY FLOW LIQUID TRANSFER DEVICE HAVING WASTE RECEPTION AREA

[75] Inventors: Roger A. Bunce, Kings Norton; Stephen J. Starsmore, Selly Oak; Gary H. G. H. Thorpe, Handsworth, all of England

[73] Assignee: British Technology Group Limited, London, England

[21] Appl. No.: 325,348

[22] PCT Filed: Mar. 31, 1994

[86] PCT No.: PCT/GB94/00708

§ 371 Date: Oct. 25, 1994

§ 102(e) Date: Oct. 25, 1994

[87] PCT Pub. No.: WO94/22579

PCT Pub. Date: Oct. 13, 1994

[30] Foreign Application Priority Data

Apr. 7, 1993 [GB] United Kingdom .................. 9307319

[51] Int. Cl.[6] .......................... G01N 21/01; G01N 30/00

[52] U.S. Cl. .......................... 422/58; 422/100; 422/101; 422/103; 436/169

[58] Field of Search .......................... 210/94, 95, 321.6, 210/511, 787, 789; 422/55, 56, 58, 61, 69, 73, 100–103, 82.05; 436/169, 170

[56] References Cited

U.S. PATENT DOCUMENTS

| | | | |
|---|---|---|---|
| 5,223,219 | 6/1993 | Subramanian et al. | 422/55 |
| 5,242,606 | 9/1993 | Braynin et al. | 210/787 |
| 5,275,785 | 1/1994 | May et al. | 422/58 |
| 5,354,538 | 10/1994 | Bunce et al. | 422/58 |

FOREIGN PATENT DOCUMENTS

| | | |
|---|---|---|
| 0034049 | 8/1981 | European Pat. Off. . |
| 0215419 | 3/1987 | European Pat. Off. . |
| 0281201 | 9/1988 | European Pat. Off. . |
| 0314499 | 5/1989 | European Pat. Off. . |
| 2216283 | 5/1993 | United Kingdom . |
| WO90/11519 | 10/1990 | WIPO . |

*Primary Examiner*—Joseph W. Drodge
*Attorney, Agent, or Firm*—Nixon & Vanderhye

[57] ABSTRACT

Capillary flow liquid transfer device having first and second flow channels, the first leading from a first channel end to a volume determination site and the second flow channel leading from a second channel end and crossing the first channel in fluid connection therewith in an interception area bordering the volume determination site directly upstream thereof relative to the flow in the first channel. The liquid flow in the second channel reaches the interception area before that in the first channel upon simultaneous application of liquid from the liquid supply to the first and second channel ends such that excess substance is received in a waste reception area separate from substance received in the volume determination site.

14 Claims, 5 Drawing Sheets

CAPILLARY FLOW LIQUID TRANSFER DEVICE HAVING WASTE RECEPTION AREA

This invention concerns liquid transfer devices and, more particularly, volume definition in such devices used for biochemical diagnostic testing in extra-laboratory situations.

BACKGROUND OF THE INVENTION

A number of such devices for manual operation have been developed in recent years, these being designed to avoid any need for complex procedures, and thus be suitable for use by lay persons. For example, to avoid the necessity of a timed sequence of reagent additions to an analyte, devices have been developed to automatically sequentially deliver such reagents by use of multiple capillary flow channels. Examples of these capillary flow diagnostic devices are further described in Patent Specification WO90/11519 and in co-pending UK Patent Applications GB-2261283 and GB-2261284.

In some applications of devices of this type a user is looking for a simple colour change to confirm the presence of a specific analyte in a sample. In others, the user may be seeking a quantified result such as a certain degree of colour change, and it is in these latter applications that a need arises to accurately measure out, or define, a desired volume of the sample onto the device.

Currently, the sample volume is measured out and applied to an analytical site of the diagnostic device, the analytical site comprising a quantity of antibodies immobilised within a specific region. The volume measuring is done using a hand pipette or capillary tube. Pipettes are expensive precision instruments and considerable skill is needed to achieve accurate results. Capillary tubes are less expensive, and may include a porous plug to define the sample volume. However, they are usually made of glass and therefore readily breakable in mass usage, and in any case an inexperienced user can find them difficult to use.

If an undefined amount of sample is applied to an analytical site, then there may well be an 'error volume' of sample deposited beyond the boundaries of the immobilised region. This is in general terms unlikely to create a major inaccuracy with respect to sample lying downstream or laterally of the immobilised region, but error sample lying upstream of the immobilised region will be passed by liquid flow through the region and there may be reaction between the antigen of interest contained therein and the antibodies at the analytical site, thus ultimately leading to an inaccurate result.

One known method of sample volume definition is to incorporate a manually operated valve mechanism, which shears off a defined volume of sample in;to the diagnostic device. Such a device is described in M. P. Allen et al, Clinical Chemistry 36 (1990) p.1591–1597. The measuring out of sample volume is thus automatically realised and possibilities for error are thus greatly reduced. However, the mechanism involves precision moving parts and is thus relatively expensive to manufacture.

SUMMARY OF THE INVENTION

It is an object of the present invention to achieve volume definition in a manner that is simple, inexpensive, automatic and which avoids the use of mechanical moving parts, and which is of a type compatible with currently available diagnostic devices.

According to one aspect of the invention, there is provided a capillary flow liquid transfer device comprising a first flow channel leading from a first channel end to a volume determination site and a second flow channel leading from a second channel end and crossing said first channel in an interception area bordering said volume determination site directly upstream thereof relative to flow in said first channel, the channels being arranged so that, subsequent to simultaneous liquid application at said first and second channel ends, liquid flow in said second channel reaches the interception area, before that in said first channel.

With this arrangement, applied substance whose volume is to be defined, such as sample, extending beyond the volume determination site into the interception area, will be carried away by liquid flow in the second channel before liquid flow in the first channel arrives at the interception area.

This provides effective volume definition, since excess volume, which might otherwise upset a quantifiable result of a diagnostic test carried out with the device, will be removed before, say, a reagent is delivered to the volume determination site. Unlike prior art volume definition techniques which simply confine a desired quantity of, say, sample, the invention ensures that excess volume is hydraulically removed in a procedural step automatically initiated by use of the device.

In a preferred embodiment a third flow channel is provided, leading from a third channel end and crossing said first channel in a further interception area bordering said volume determination site directly downstream thereof relative to flow in said first channel, said third channel being arranged so that, subsequent to simultaneous liquid application at said first, second and third channel ends, liquid flow in said third channel reaches said further interception area before that in said first channel.

With such a device, excess volume extending beyond the volume determination site into the further interception area will be carried away by liquid flow in the third channel before liquid flow in the first channel arrives at the further interception area.

The provision of both the second and third flow channels bordering the volume determination site both upstream and downstream thereof relative to flow in the first channel allows balancing of the hydraulic pressures over the volume determination site and this prevents liquid flow in the second and third channels from being diverted into the volume determination site.

Commonly, the applied substance whose volume is to be defined is a sample of blood serum or urine, but may be for example a reagent whose volume is required to be defined for subsequent delivery to a sample, or a diluent, whose volume is to be defined for subsequent delivery to a reagent or sample.

Preferably the second channel and/or the third channel, after crossing the first channel, lead(s) to a waste reservoir. This reservoir receives the flow carrying away excess volume from the interception area or areas.

In order to check the satisfactory functioning of the device, it may comprise means for indicating to a user the contents of the waste reservoir. This may be a plurality of windows which give a view of the waste reservoir through a device housing, and provide a visual indication of the amount of a given substance within the waste reservoir.

Preferably, the flow channels of the device are conformed to prevent liquid flow in the first channel being diverted by flow in the second and/or third channel, and this may be done by including at least one further flow channel in the device to provide hydraulic flow balancing.

In a further aspect of the invention, there is provided a first liquid transfer means for transporting liquid by capillary action to a site defined by boundaries, at which site a substance is to be applied;

applying substance in a quantity at least sufficient to fill said site such that substance may extend beyond the boundaries of said site; and providing second liquid transfer means that, once said first liquid transfer means is operated, automatically transports liquid by capillary action to entrain and remove substance extending beyond the boundaries of said site before said first liquid transfer means has transported liquid to said site.

The substance may be applied to the site by way of a separation membrane through which selected constituents may travel.

BRIEF DESCRIPTION OF THE DRAWINGS

Specific embodiments of the invention will now be described by way of example with reference to the accompanying drawings in which.

DETAILED DESCRIPTION OF THE INVENTION

Figure 1A:
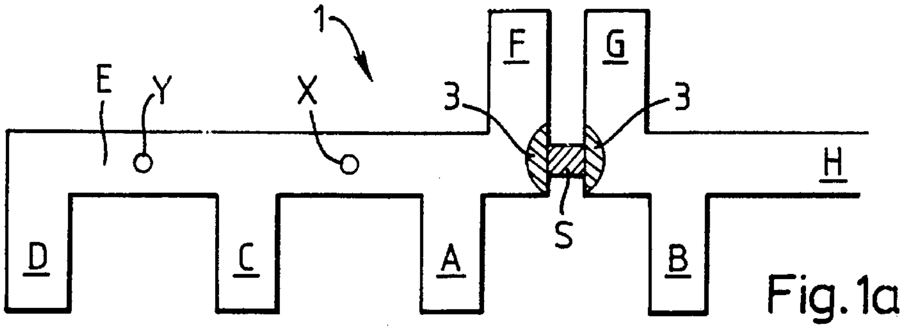
FIGS. 1*a* and 1*b* represent one embodiment of a device according to the invention.
Figure 1B:
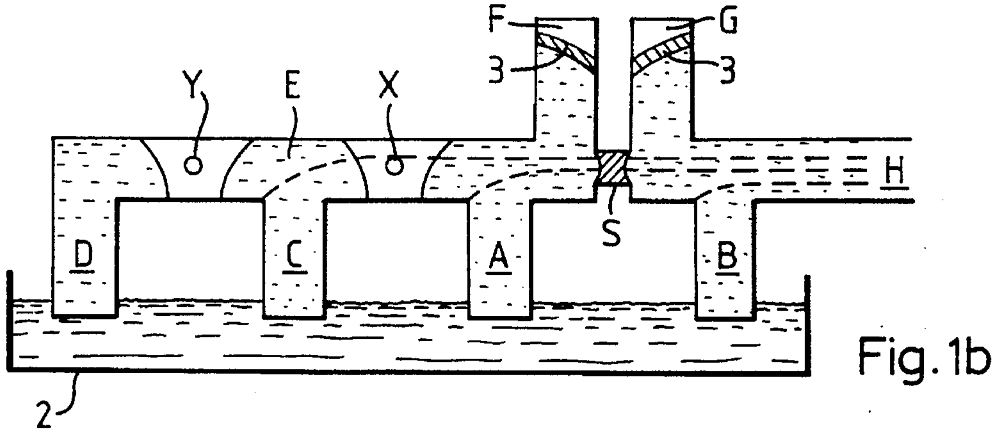

FIGS. 1*a* and 1*b* shows an analytical test device 1 comprising a sheet of porous material for carrying out sequential delivery of two reagents X and Y to an analytical site S. The device features a number of interconnected channels, four of which, A,B,C and D, are formed as 'legs', the free ends of which are adapted to be simultaneously introduced to a liquid reservoir 2 which contains an appropriate buffer solution. A transverse common channel E links the other ends of these four legs and in this channel are located sites for reagents X and Y, between the ends of pairs of legs A and C, and C and D, respectively.

The volume determination site is a sample site S, which in this case is the analytical site, and is located in a portion of channel E between the ends of legs A and B. Typically at this position an antibody is held which is capable of reacting with an antigen of interest contained in the applied sample.

When liquid is introduced to the ends of legs C and D it is drawn up through the porous material by capillary action until it reaches transverse channel E, along which it then moves towards analytical site S, solubilising and entraining reagents X and Y such that they are subsequently delivered in turn to the analytical site. This basic technique of automatic sequential delivery is disclosed in the above mentioned publication WO 90/11519 and reference can be made thereto for more specific details of such devices.

A fluid sample, which may be urine or blood serum, say, is applied to analytical site S before the device s activated. This may be accomplished by depositing a quantity of sample on an application 'window' realised in a housing (not shown) surrounding the porous material of the test device. Analytical site S is defined by the immobilised antibody region, but it is likely that excess sample 3 will also find itself deposited in or ingressing into the porous material, this excess sample being capable of affecting the diagnostic procedure such that a false result may ultimately be obtained. Legs A and B are arranged symmetrically of analytical site S as shown in FIG. 1 and the device also features additional waste channels F and G which extend transversely from channel E on either side of site S and on the opposite side of channel E from legs A and B. Transverse flow channel E continues downstream beyond analytical site S into waste channel H where waste products from the reactions are ultimately washed.

The operation of this device can be seen from FIG. 1*b*. Upon activating the device (by simultaneously introducing the ends of legs A,B,C and D to liquid reservoir 2) liquid flows by capillary action along all four legs and into transverse common channel E. Liquid from legs A and B flows past analytical site S and into waste channels F and G respectively, and in passing through notional 'interception' areas bordering the analytical site S on either side thereof, this flow entrains, or 'slices off', excess sample 3, and carries it away into the waste channels F and G, leaving only the defined quantity of sample corresponding to the immobilised region at the analytical site. Subsequently reagents X and Y, solubilised by liquid flow from channels C and D are delivered successively to the analytical site and incubate with the defined amount of sample to produce an indication of detected content for the user, before all waste products are washed by the continuing flow into waste channel H. Meanwhile, excess sample 3 remains trapped in waste channels F and G and is not redirected by diffusion and subsequent flow into the sample site. It therefore has no further part in the process. It is important therefore that in such devices the flow carrying removed excess sample has stopped before wash liquid and subsequent reagent begins to flow at the analytical site.

Figure 2:
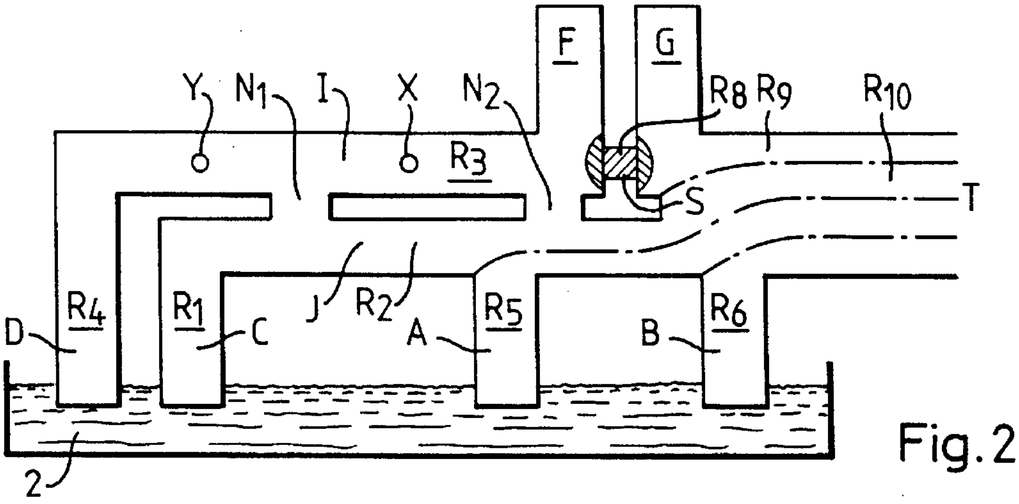
FIG. 2 represents a second embodiment of such a device.

In actual fact experimentation has shown that the delivery of reagents to the analytical site is distorted by the flow from legs A, B and C (shown by dotted lines in FIG. 1*b*), and to reduce this problem an improvement to the hydraulic circuit of the device is shown in FIG. 2. In this embodiment transverse channel I connects the end of leg D with the analytical site S, whilst additional transverse channel J connects the end of leg C with the ends of legs B and A. Parallel transverse channels I and J are interconnected at nodes $N_1$ and $N_2$ as shown in FIG. 2. Channels I and J continue downstream into common waste reservoir T.

Figure 3:
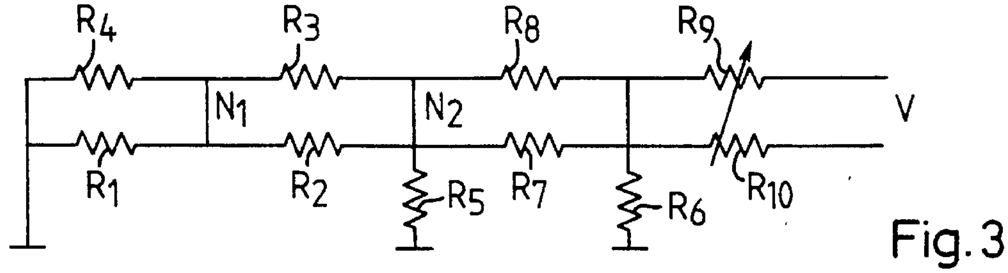
FIG. 3 depicts an electrical circuit analogue of the device shown in FIG. 2.

It is well understood that hydraulic flow and pressure are analogous to electrical current and voltage, with hydraulic resistance to flow equating with electrical resistance. However, the hydraulic flow in porous media exhibits some laminar characteristics and forms separate subflows within the various channels. FIG. 2 represents the hydraulic resistances $R_1$ to $R_{10}$ of each portion of the hydraulic circuit, and the electrical analogue circuit is given in FIG. 3. As can be appreciated from this figure, the circuit comprises electrical resistors $R_1$ to $R_{10}$ and incorporates a double electrical bridge, and by careful selection of the relative values of these resistors null currents can be created at nodes $N_1$ and $N_2$. In the equivalent hydraulic circuit the result of an analogous hydraulically balanced arrangement is therefore to achieve null flow between transverse channels I and J at nodes $N_1$ and $N_2$ once these channels are saturated. It will be appreciated that the flows in channels A and B and the subflows downstream of the sample region at T (shown by dot-dash lines), also contribute to the flows in the double bridge hydraulic network. The device will still achieve the effect of initial 'slicing off' of excess sample from analytical site S, but once saturation occurs the bridge circuits will balance and the flow will continue such that reagents X and Y can be delivered to the analytical site without flow In channel I being distorted by that in channel J. Sample excess will again be retained in waste channels F and G and will therefore be unable to interfere in the process.

Whilst only the flow passing from A to F is needed to remove excess sample upstream of the analytical site (this being the excess contributing to inaccuracies in results), the flow passing from B to G across the interception area downstream of the analytical site is required to provide hydraulic balancing across the site and thus prevent any liquid flow from being diverted across the site.

As can be appreciated from the above, by appropriate design of the hydraulic circuit, balanced flows can be established once the excess sample has been sliced off and carried away from the analytical region, thus defining the correct sample volume.

EXAMPLES

Three specific examples of devices illustrative of the invention will now be described, for use in biochemical assay procedures.

Example 1

FIG. 4 shows an analytical device 20 in the form of a capillary flow circuit made from porous material, in this case Millipore AP25 filter paper. It may be used to indicate in a fixed area display the presence of pregnancy hormone HCG in a urine sample.

Liquid channels are formed by cutting or by wax printing impervious barriers. Channel 21 extends from a channel end 35 across a widened common flow region 33, and on to waste reservoir 24. The common flow region is connected to a source of liquid 22 through channel 26 via channel end 36. An analytical site 23 is located in the common flow region 33, in line with channel 21 and with the connection to waste reservoir 24. The common flow region 33 also includes channels 25 and 28 which can be connected to liquid source 22 via the channel 26. Channel 25 crosses and connects to channel 21 and terminates in waste reservoir 27. Channel 28 is also connected to channel 26, crosses and connects to channel 21, and terminates in a separate waste reservoir 29. An impermeable barrier 32 is provided in the form of a bar defining an obstacle between analytical site 23 and flow arriving at the common flow region 33 from channel 26.

Figure 4A:
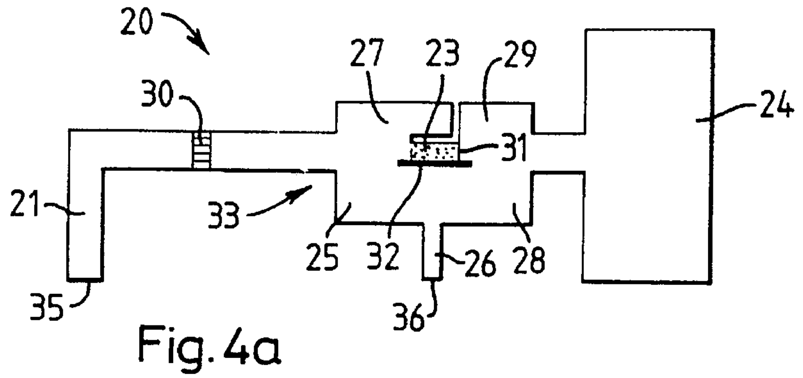
FIGS. 4*a*–7*b* represent respective further embodiments with respect to biochemical assay procedures.

Positioned on channel 21 is a zone of blue latex particles 30 which are coated with a second antibody to HCG, and which are free to be entrained and to move with liquid flow along the channel. Positioned at the analytical site 23 is a defined zone of a first antibody to HCG 31 which is immobilised to the porous material within a specific region as shown in FIG. 4*a*.

Figure 4B:
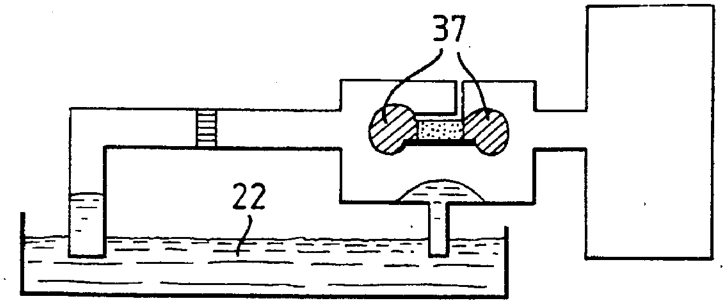

In use, a urine sample for analysis is applied at the analytical site 23 and HCG hormone present In the sample proceeds to bind to the immobilised first antibody. The sample volume is undefined at this stage and excess sample ingresses beyond the specific immobilised region 31 into excess regions 37 (FIG. 4*b*).

Figure 4C:
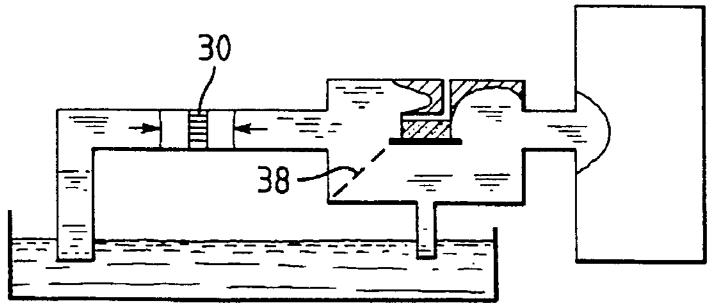
Figure 4D:
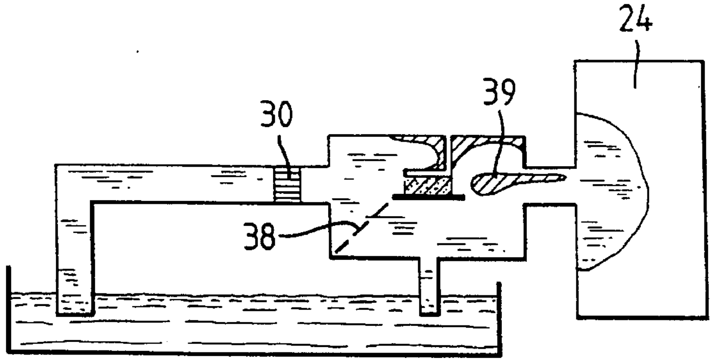

It Is important that the applied sample volume is chosen with respect to the thickness of the material of the device so that a volume of the sample to be defined is substantially uniformly distributed, at least within the material defined by zone 31. Furthermore, as a practical requirement of this and subsequent examples, the volume of applied sample must not be so great as to ingress beyond the capability of the volume definition means. For example excess sample volume 37 to the left of analytical site 23 must be less than the liquid capacity of reservoir 27. The device is then connected to the source of liquid 22 via the ends 35 and 36 of channels 21 and 26, as shown n FIG. 4*b*, and liquid begins to flow along these channels by capillary action. The lengths of channels are selected such that liquid flows up channel 26 and along channels 25 and 28 respectively, about each side of transverse bar 32 and analytical site 23, and washes excess urine sample into reservoirs 27 and 29 respectively, before liquid from channel 21 reaches the common flow region 33. This is shown in FIG. 4*c*, in which the whole common flow region has become saturated. Meanwhile, liquid continues to flow in channel 21 and opposing flows in this channel (shown by arrows) meet at the second antibody zone 30. Once saturated, all liquid in channel 21, including entrained blue latex particles coated with second antibody, begins to flow towards the analytical site 23 and waste reservoir 24. Liquid flow serves to wash any unbound sample 39 from the analytical site towards reservoir 24 (FIG. 4*d*) before the blue latex particles coated with second antibody 30 arrive at the analytical site 23. Any HCG antigen present in the sample, now bound to the first antibody 31 immobilised at the analytical site, binds to the blue latex particles thereby forming a visual indicator to display to the user an indication of the amount of HCG antigen present. Further liquid flow serves to wash unbound latex particles into reservoir 24 and thereby visually enhance any bound at the analytical site. Flow terminates when reservoir 24 is totally saturated.

After the sample volume has been defined as described above it is important to prevent flow arriving from channel 26 joining and distorting that in channel 21 travelling towards the analytical site 23. This is achieved by arranging the dimensions of channels 21, 25, 26 and 28 to form a hydraulic bridge circuit such that the bridge is balanced to attain zero flow along a stagnation line 38 (FIG. 4*c*). This design can be achieved by calculation, computer modelling or by iterative empirical determination.

Figure 4E:
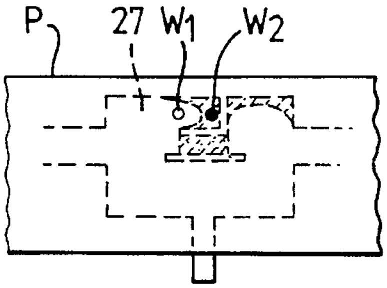

As previously explained the sample excess waste reservoirs are designed so that waste products remain trapped therein, since it is important that these products do not interfere in subsequent stages of the process. To monitor this, 'sample too large' or 'sample too small' indicators can be provided. FIG. 4*e* shows a detail of the device of FIG. 4*a* contained within a housing P provided with two transparent windows $W_1$ and $W_2$ coincident with reservoir 27. If the sample is coloured (such as blood), then the appearance of the colour in one or both of the windows indicates the presence of the trapped excess sample. If the sample is colourless then a chemical, which produces a colorimetric reaction with the sample, can be incorporated into the waste reservoir. FIG. 4*e* shows a satisfactory result, with the steady state situation being the appearance of colour only in window $W_2$. If the colour appears in neither window then this a 'sample too small' indication, and if the colour appears in both windows $W_1$ and $W_2$ then this provides a 'sample too large' indication. In either case the user is warned that the sample volume is inappropriate to perform an accurate test.

Example 2

FIG. 5 illustrates an analytical device 40 in the form of a capillary flow circuit constructed generally as described in example 1 but with a linear analogue display to indicate a quantifiable result. Its purpose is to quantify the amount of cholesterol present in a specimen of blood serum.

A channel 41 extends from an end 42 for liquid application through a widened common flow region 44 and to waste reservoir 43. A channel 45 extends from an end 46 to the common flow region 44 and separates into two channels 47 and 48 which connect to channel 41. A third channel 49 connects an end 50 to channel 41 midway between the points at which channels 47 and 48 connect to channel 41. Liquid impermeable bars 51, 52 and 53 are provided in common flow region 44. Parallel bars 51 and 52 between the points at which channels 45 and 49 connect with the common flow region 44 define a first immobilised region 54 therebetween and in this specific region, which corresponds to the sample site, a fixed volume of cholesterol esterase and cholesterol oxidase is immobilised onto the porous material. Located alongside liquid-impermeable bar 53 is an elongated second immobilised region 55 where horseradish peroxidase (HRP) on a colorimetric substrate is immobilised onto the porous material. Bar 53 separates the porous material into two parallel channels **41*a* and 41*b*, region 55 being in channel 41*b*, and the region lies in line with first immobilised region 54**.

Figure 5A:
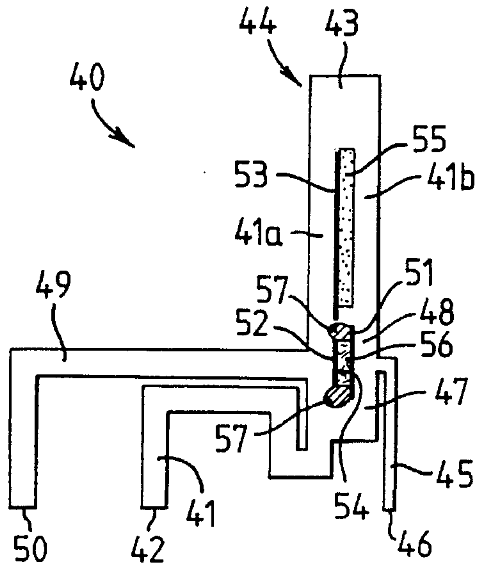
Figure 5B:
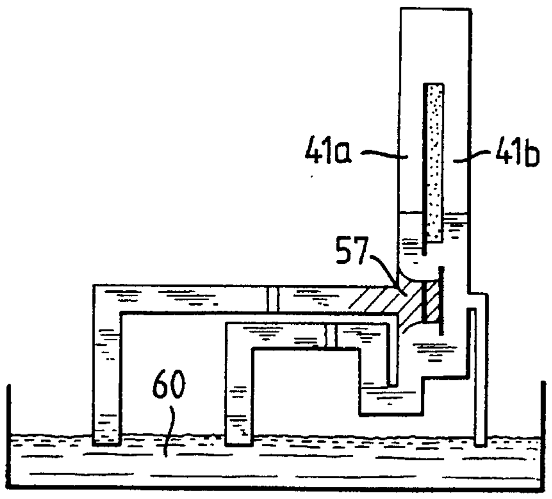
Figure 5C:
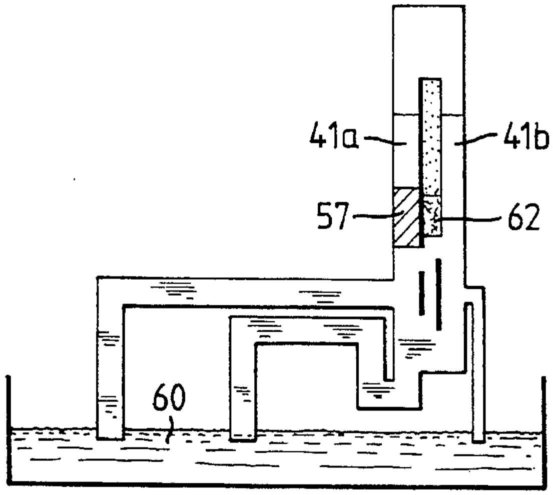

In use, an undefined volume of serum sample 56 Is applied at the first immobilised region and excess serum 57 ingresses beyond the boundaries of the region 54. The ends 42,46 and 50 of channels 41, 45 and 49 respectively are then simultaneously introduced to a liquid source 60 (FIG. **5*b*) and the liquid commences to flow in the channels. The combined length of channels 45 and 47, and that of channels 45 and 48, between channel end 46 and the first region 54, are chosen such that liquid flows about each side of the region 54 before liquid In channels 41 and 49 reaches the common flow region 44. This initial liquid flow washes excess serum 57 into channel 41, to the left of liquid impermeable bar 52 as shown In FIG. 5*b*. Meanwhile, liquid continues to flow n channels 41 and 49, and opposing flows eventually meet in these channels. During this time any cholesterol contained in the serum sample, the volume of which has now been automatically defined, reacts with the fixed volume of immobilised cholesterol esterase and cholesterol oxidase in first region 54, to produce an amount of hydrogen peroxide proportional to the amount of cholesterol present. The hydrogen peroxide then begins to flow upward carried by the liquid flow, thus terminating the first incubation stage. Providing the device is connected quickly to the liquid reservoir 60** after sample application, the incubaton stage producing hydrogen peroxide is timed automatically by the liquid travel time in the various channels.

Figure 5D:
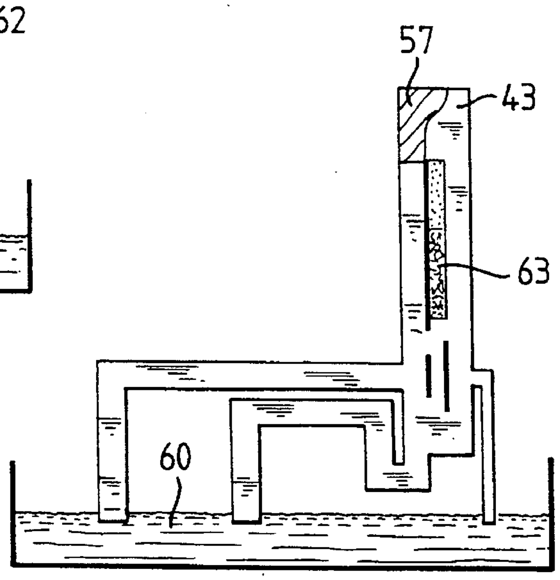

A 'slug' of hydrogen peroxide 62, proportional to the amount of cholesterol in the sample, then ascends channel **41*b* (FIG. 5*c*) and reacts with the HRP and the colorimetrc substrate at second immobilised region 55. This produces an insoluble coloured product 63, the reaction using up hydrogen peroxide as the latter ascends channel 41*b* such that a coloured line or bar s produced whose length is proportional to the amount of cholesterol in the serum sample (FIG. 5*d***). The user can read off the cholesterol level from a graduated scale on the device housing (not shown).

After the sample volume has been defined as described above it is important to prevent flow from the various channels distorting the 'slug' of hydrogen peroxide and its ascent in channel **4l*b*. Once again, this is achieved by arranging the dimensions and positioning of the various channels to produce a balanced hydraulic circuit, such that when saturated there will be no flow between channels 41*a* and 41*b*. The slug will then travel straight into immobilised site 55, and the excess sample 57 will be washed straight up channel 41*a* and into the waste reservoir 43 (FIG. 5*d***).

Example 3

FIG. 6 shows an alternative analytical device 70, again taking the form of a capillary flow circuit in porous material. This example concerns once again a cholesterol assay and a linear analogue result, and uses the same chemistry as example 2 above, the device distinguishing itself in that it can be fabricated in a more compact form, using only two channels instead of three to connect to the liquid source.

Figure 6A:
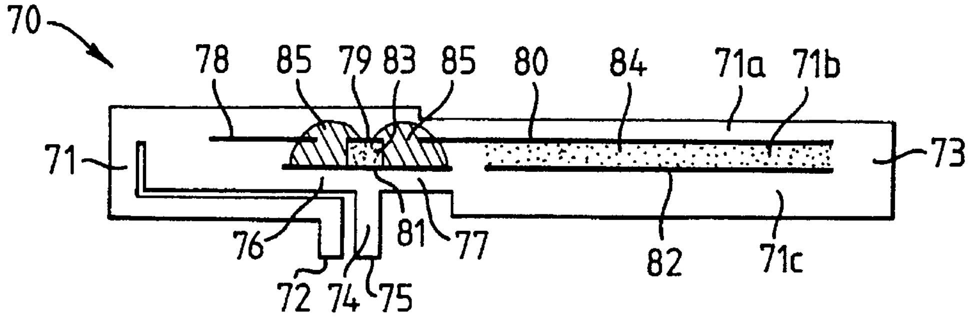

Channel 71 extends from an end 72 to reservoir 73. Channel 74 extends from end 75 via channels 76 and 77 and connects to channel 71. Channel 71 is separated into channels **71*a*, 71*b* and 71*c* by parallel liquid impermeable bars made up of in line portions 78, 79, 80 and 81, 82 respectively, as can be seen in FIG. 6*a*. A first immobilised region 83, corresponding to the sample site, is located between bars 79 and 81 and defined by an area of cholesterol esterase and cholesterol oxidase. An area of immobilised HRP on a colorimetrtc substrate 84 makes up the second immobilised region which occupies a strip of material between bars 80 and 82, in channel 71*b***.

Once again in use an undefined volume of serum sample is applied at the first immobilised region, ingressing beyond the boundaries of the region to provide excess 85 in the surrounding channels (FIG. **6*a***).

Figure 6B:
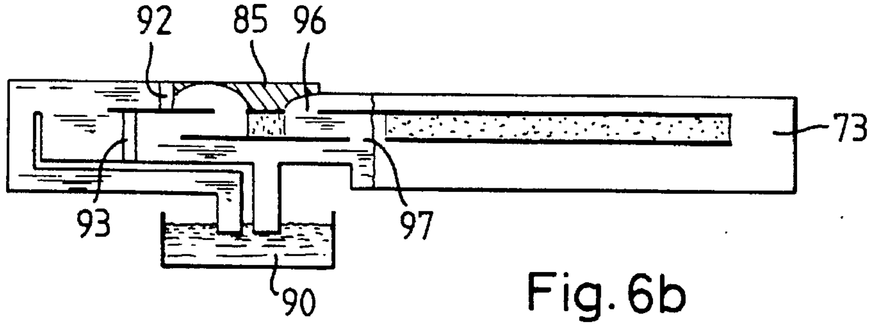
Figure 6C:
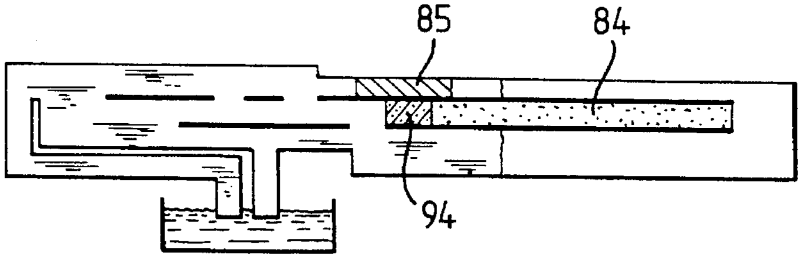
Figure 6D:
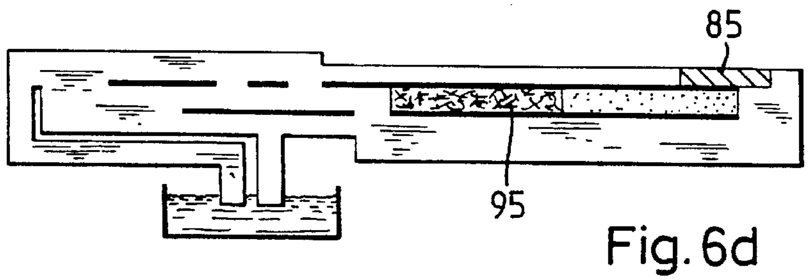

The channel ends 72 and 75 are then connected to liquid source 90 (FIG. **6*b*). As liquid from channel 74 through channels 76 and 77 reaches the sample before that from channel 71, it flows around either side of impermeable bar 81 and washes excess serum 85 into channel 71 (FIG. 6*b*). Meanwhile, liquid continues to flow in channel 71 from channel end 72 and opposing flows meet as shown at 92 and 93, from where the liquid moves towards the immobilised regions and waste reservoir 73. In a similar manner to the operation of the device of Example 2, a 'slug' of hydrogen peroxide 94 is produced at first region 83 and carried into second region 84 in channel 7l*b*, where it begins to react with the HRP and colorimetric substrate therein FIG. 6*c*). Again, a coloured bar 95 is produced whose length is proportional to the amount of cholesterol in the metered serum sample FIG. 6*d***).

After the sample volume has been defined it is important to prevent flow from entering or leaving the analytical channel **71*b*other than axially. This is achieved by arranging the geometry of the device to create a balanced hydraulic bridge circuit such that once saturated no flow occurs across connections 96 and 97 between channels (FIG. 6*b***).

Clearly, numerous other devices can be designed according to the invention for a wide variety of different analytical tests, in each case arranging that initial liquid flow automatically removes excess sample from around a defined reaction area, subsequent flow being such that this removed excess will not interfere with later stages of the analysis.

The invention may be used in conjunction with separation membranes such as plasma/red cell separation membranes as described in, e.g., Patent Specification U.S. Pat. No. 5,240,862. Such a membrane entraps red blood cells but allows plasma to pass.

Figure 7A:
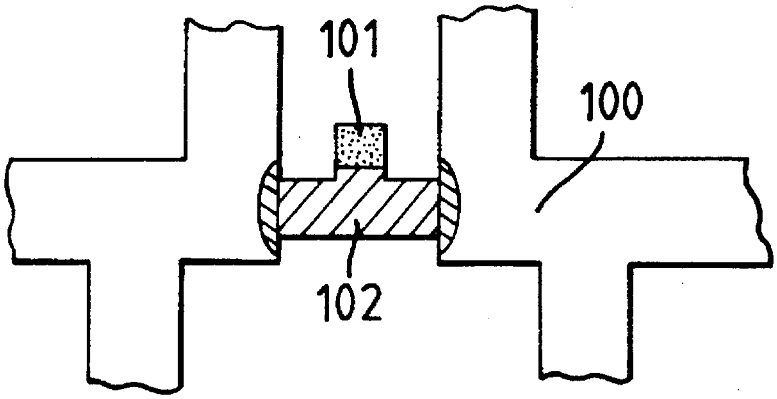
Figure 7B:
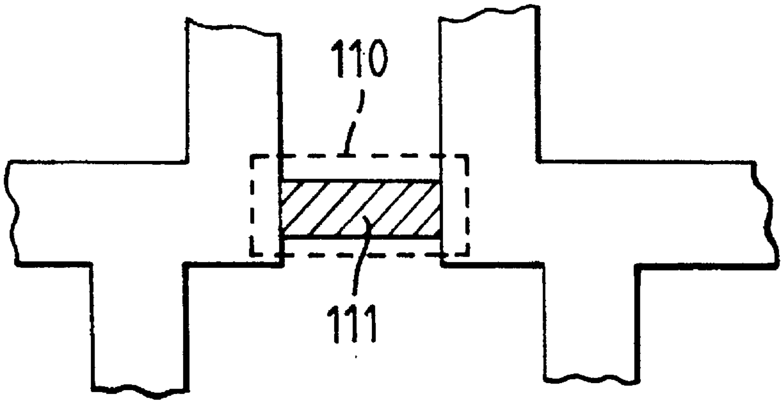

The use of a separation membrane in a device according to the invention is illustrated in FIGS. **7*a* and 7*b*. In FIG. 7*a*the dominant flow of plasma is along the separation membrane 100, the whole blood being applied to a retention zone 101 arranged symmetrically to and adjacent to the plasma volume definition region 102. The dimensions of the retention zone are such that the red blood cells are retained within this zone, whilst the plasma can fill and extend beyond the plasma volume definition region 102, the volume to be determined by subsequent liquid flow according to the invention. In FIG. 7b the dominant flow of plasma is transverse to the plane of the separation membrane 110, in this case a separate membrane which overlies and extends beyond the plasma volume definition region 111**.

Separation membranes such as X-flow PS21 are suitable for this application.

It is to be noted that each device preferably additionally comprises a housing around the porous material through which the sample can be applied, and may also additionally comprise a means of connecting the device to a liquid source, ensuring the liquid is applied to the extremity of each appropriate channel simultaneously.

To make the devices more compact, they need not be of planar form but may be folded or composed of multiple superposed layers forming the various channels, with cross connections provided between different layers.

The above examples use porous material suitable for capillary flow, such as filter paper. However the invention can also be applied in devices employing non-porous capillary action, such devices still providing hydraulic circuits which can be designed to produce the desired flow conditions when component channels are filled.

It will also be appreciated that the specific device embodiments and indeed other devices according to the invention are not intended to be limited to adaptation and use in diagnostic applications.

Embodiments of the invention illustrated in the accompanying Figures and described above are given by way of example only, and it should be understood that these in no way limit the scope of the invention, which is intended to embrace all embodiments falling within the spirit and scope of the appended claims.

We claim:

1. A capillary flow liquid transfer device comprising:

a first flow channel leading from a first channel end to a volume determination site for receiving an applied substance, said first channel end being connectable to a liquid supply;

a second flow channel leading from a second channel end connectable to said liquid supply; and waste reception means connected to said second flow channel for receiving excess of said applied substance separate from substance received in said volume determination site;

said second flow channel crossing said first flow channel in fluid connection therewith in an interception area bordering said volume determination site directly upstream thereof relative to flow in said first flow channel, said first and second flow channels being constructed and arranged such that said liquid flow in said second flow channel reaches said interception area before that in said first flow channel upon simultaneous liquid application from said liquid supply at said first and second channel ends, and such that said excess substance is directed to said waste reception means separate from substance received in said volume determination site.

2. A device according to claim 1, and further including a third flow channel, leading from a third channel end connectable to said liquid supply, said third flow channel being connected to a further waste reception means for receiving excess of said applied substance separate from substance received in said volume determination site, said third flow channel crossing said first flow channel in fluid connection therewith in a further interception area bordering said volume determination site directly downstream thereof relative to flow in said first flow channel, said flow channels being constructed and arranged such that said liquid flow in said third flow channel reaches said further interception area before that in said first flow channel upon simultaneous liquid application from said liquid supply at said first, second and third channel ends, said further excess substance being directed to to said further waste reception means separate from substance received in said volume determination site.

3. A device according to claim 2, wherein said further waste reception means is a further waste reservoir.

4. A device according to claim 2, wherein the flow channels are conformed to prevent liquid flow in said first channel being diverted by flow in said second and third channels.

5. A device according to claim 4 wherein at least one further flow channel is included in order to provide hydraulic flow balancing.

6. A device according to claim 1, wherein said waste reception means is a waste reservoir.

7. A device according to claim 6 comprising means for indicating the contents of the waste reservoir.

8. A device according to claim 7 including a housing around the liquid flow channels, the indicating means comprising at least two windows, giving a view through the housing of the waste reservoir, to provide a user with a visual indication of the amount of a given substance within the waste reservoir.

9. A device according to claim 1, wherein the volume determination site is a sample application site in a biochemical diagnostic assay device.

10. A device according to claim 9, wherein the first channel contains at least one reagent for entrainment in the liquid flow therethrough.

11. A device according to claim 9 wherein the volume determination site contains a reagent to separate and/or immobilise a constituent of the substance so the constituent can be assayed.

12. A device according to claim 1, wherein the channels are formed from a single sheet of porous material.

13. A capillary flow liquid transfer device, comprising:

a first liquid transfer means for transporting liquid from a liquid supply by capillary action to a site defined by boundaries, said site receiving an applied substance in a quantity at least sufficient to fill said site such that said substance may extend beyond said boundaries of said site;

a second liquid transfer means for transporting liquid from said liquid supply by capillary action to an interception area bordering said site, but outside said boundaries thereof; and waste reception means connected to said second liquid transfer means for receiving excess of said applied substance separate from substance received in said site;

said first and second liquid transfer means begin constructed and arranged such that liquid is automatically transported by capillary action through said second liquid transfer means to entrain and remove substance extending beyond said boundaries of said site to said waste reception means separate from substance received in said site before said first liquid transfer means has transported liquid to said site once said liquid transfer means is operated by connection to said liquid supply.

14. A device according to claim 13, including a separation membrane overlying and abutting said site, through which selected constituents may travel, by way of which membrane the substance may be applied to said site.

* * * * *